(12) United States Patent
Frazier et al.

(10) Patent No.: US 10,364,938 B2
(45) Date of Patent: Jul. 30, 2019

(54) UNDERWATER ENERGY STORAGE USING COMPRESSED FLUID

(71) Applicant: Bright Energy Storage Technologies, LLP, Arvada, CO (US)

(72) Inventors: Scott Raymond Frazier, Morrison, CO (US); Brian Von Herzen, Minden, NV (US); Alex Lau, Arvada, CO (US)

(73) Assignee: Bright Energy Storage Technologies, LLP, Arvada, CO (US)

( * ) Notice: Subject to any disclaimer, the term of this patent is extended or adjusted under 35 U.S.C. 154(b) by 625 days.

(21) Appl. No.: 14/596,448

(22) Filed: Jan. 14, 2015

(65) Prior Publication Data

US 2015/0198285 A1 Jul. 16, 2015

Related U.S. Application Data

(60) Provisional application No. 61/927,634, filed on Jan. 15, 2014.

(51) Int. Cl.
*F17C 1/00* (2006.01)
*F17C 13/00* (2006.01)

(52) U.S. Cl.
CPC ........... *F17C 1/007* (2013.01); *F17C 13/002* (2013.01)

(58) Field of Classification Search
CPC ................ F17C 1/007; F17C 13/002
USPC ......................................... 405/210
See application file for complete search history.

(56) References Cited

U.S. PATENT DOCUMENTS

| 4,958,956 A | 9/1990 | Tanaka et al. |
| 2004/0191000 A1* | 9/2004 | Webster .................... F17C 1/16 405/210 |
| 2011/0070031 A1* | 3/2011 | Frazier .................... E02D 29/10 405/210 |
| 2012/0012276 A1 | 1/2012 | Von Herzen et al. |

FOREIGN PATENT DOCUMENTS

JP 10-061599 A 3/1998

* cited by examiner

*Primary Examiner* — Anna M Momper
*Assistant Examiner* — Patrick F Lambe
(74) *Attorney, Agent, or Firm* — Ziolkowski Patent Solutions Group, SC (57) ABSTRACT

A compressed fluid energy storage system includes a submersible fluid containment subsystem charged with a compressed working fluid and submerged and ballasted in a body of water, with the fluid containment subsystem having a substantially flat portion closing a domed portion. The system also includes a compressor and an expander disposed to compress and expand the working fluid. The fluid containment subsystem is at least in part flexible, and includes an upper portion for storing compressed energy fluid and a lower portion for ballast material. The lower portion may be tapered proximate the flat portion to prevent it from being collapsed by ballast materials. The region between the fluid and the ballast has exchange ports to communicate water between the inside and outside of the containment subsystem. In other embodiments, an open-bottomed fluid containment system is held in position underneath a ballast system by a tensegrity structure.

37 Claims, 5 Drawing Sheets

UNDERWATER ENERGY STORAGE USING COMPRESSED FLUID

CROSS-REFERENCE TO RELATED APPLICATION

The present application is a non-provisional of, and claims priority to, U.S. Provisional Patent Application Ser. No. 61/927,634, filed Jan. 15, 2014, the disclosure of which is incorporated herein by reference it its entirety.

FIELD OF THE INVENTION

The invention relates generally to compressed fluid energy storage and, more particularly, to a method and apparatus of storing compressed fluid in an underwater storage device.

BACKGROUND

Cost-effective storage for the electrical grid has been sought from the beginning of electrical service delivery but is not yet available. The variation in power demand throughout a day, and season-to-season requires having generating stations that are utilized only part of the year, increasing capital and operations and maintenance costs for stations used at less than full capacity. Furthermore, some generating stations are difficult to throttle or shut down and return to full power within short periods of time. This lack of practicable energy storage results in the vast majority of the challenges faced by parties operating electrical grid(s).

With the increased recognition that continued carbon emissions from burning fossil fuels is unsustainable on multiple levels, and that proliferation concerns exist for nuclear power, it has become clear that relatively large amounts of renewable energy (RE) will be needed to provide power for the grid. Hydroelectric power, when combined with a reservoir, is one RE source that can be throttled up and down to match the varying power loads, also called "load-following". Geothermal and Ocean Thermal Energy Conversion are also good baseload RE resources, despite their limited locations. However, the solar wind, wave, tidal, and current energies are all intermittent. Energy storage is required for those sources to substantially contribute to the grid energy supply.

Cost parameters of several leading storage technologies may be considered for large scale energy systems. Each technology has its own cost drivers. Pumped hydroelectric, for example, has been used for many decades and is often considered the standard by which other grid-energy-storage ideas are judged. It is efficient, consumes no fuel upon harvesting the stored energy, but is constrained by geography. A substantial elevation change and two reservoirs are typically required. Most of the viable sites in North America are considered to be already developed. Regardless of cost, it does not appear that pumped hydroelectric will be able to contribute much additional energy storage capacity. It is also fairly expensive in terms of capital cost per unit power ($/kW) but nonetheless is widely used when available because of the fairly low capital cost per unit energy ($/kWh).

Considerable effort is going into "conventional" batteries, but most of that effort is focused on electric vehicle energy storage, where weight is a critical parameter. As such, many of the "new" battery technologies are actually considerably more expensive than can be tolerated for grid-energy-storage systems. Thus, these batteries for hybrid electric vehicles are often able to provide considerable power per unit cost, but are still very expensive per unit energy. Flow batteries are a newer technology where the chemicals are stored in tanks and reacted in systems similar to fuel cells. The cost of the fairly unusual chemicals used as the reactants leads to moderately high cost per unit energy and unit power.

Compressed Air Energy Storage (CAES) is an attractive energy storage technology that overcomes many drawbacks of known energy storage technologies. The conventional approach for CAES is to use a compressor to store the compressed air underground. The energy is harvested by expanding the compressed air through a turbine. In this process, the air is mixed with natural gas, combusted and expanded through the turbine. The system operates at high pressure in order to take advantage of the modest volume of the underground cavern or aquifer. The result is a system that operates with constant volume and variable pressure during the storage and retrieval process, which results in extra costs for the compressor and turbine system, since they operate best at a single design pressure. The heating during compression and the cooling during expansion of air also require special attention in order to obtain suitable efficiencies.

Conventional CAES reheats the air efficiently using combustion of natural gas (often by absorbing heat from the gas turbine exhaust). Such systems often have two separate compressors and turbines. They therefore have a greater capital expense, over and above the cost of the natural gas. The result is that the power plant, when utilizing purchased off-peak power to charge the air reservoir, generates power with about ½ the use of natural gas per unit energy but with a moderately expensive set of equipment and higher fuel costs.

A need exists to provide grid-scale energy storage that is more energy-efficient, lower in cost, more responsive, and more geographically ubiquitous than traditional underground CAES.

SUMMARY OF THE INVENTION

In a first aspect a compressed fluid energy storage system is provided comprising a submersible fluid containment subsystem disposed longitudinally along a vertical axis when submerged and ballasted in a body of water and charged with a compressed working fluid, the fluid containment system comprising a substantially flat portion closing a domed portion; a compressor disposed in fluid communication with the fluid containment subsystem and configured to supply compressed working fluid to the fluid containment subsystem; and an expander disposed in fluid communication with the fluid containment subsystem and configured to receive compressed working fluid from the fluid containment subsystem and expand the compressed working fluid; wherein the fluid containment subsystem is at least in part flexible. The compressor and the expander may be the same device and the expander may be disposed to drive an electrical generator. The working fluid may be one or more of a compressible gas, a compressible liquid, and a supercritical fluid, and the compressible gas may be air. The substantially flat portion may be a substantially circular flat portion.

The system may further comprise at least one exchange port disposed generally in a shell of the fluid containment subsystem for allowing the ingress of water from the body of water into the fluid containment subsystem and for allowing the egress of water and materials from the fluid containment subsystem to the body of water. The at least one exchange port may be disposed in the shell of the fluid containment subsystem below a vertical location, the vertical location corresponding to a predetermined lowest location to be occupied by compressed energy fluid in the fluid containment subsystem. The at least one exchange port may disposed in the shell of the fluid containment subsystem radially substantially closer to the vertical axis than a smallest radial distance from the vertical axis at which the flat portion exhibits substantial vertical curvature when the fluid containment system is in use. The at least one exchange port may a plurality of exchange ports and the plurality of exchange ports may separate the fluid containment subsystem into a separate upper portion and separate lower portion configured to be joined together with fittings.

The fluid containment subsystem may further comprise a first inlet-outlet port configured for placing the fluid containment subsystem in fluid communication with the compressor and the expander.

The fluid containment subsystem may further comprise ballast material disposed within a lower portion of the fluid containment subsystem. The ballast material may be sediment from the bed of the body of water. The system may further comprise a flushing conduit connected to the first inlet-outlet port inside the fluid containment subsystem and directed to the ballast material within the fluid containment subsystem, the flushing conduit disposed for using water to flush ballast material from the fluid containment subsystem through an exchange port into the body of water. The flushing conduit may be perforated proximate the inlet-outlet port. The inlet-outlet port may be disposed at a vertical apex of the fluid containment subsystem and the vertical apex is directed upward.

The system may further comprise a compressed fluid conduit disposed to provide the fluid communication between the fluid containment subsystem and the compressor and expander. The compressed fluid conduit may be flexible, semi-flexible, or jointed. The system may further comprise a support on the body of water for supporting the compressed fluid conduit at at least one point to impart to the compressed fluid conduit a catenary shape.

In a further embodiment, the system may comprise a ballast subsystem for weighting down the fluid containment subsystem on or proximate a bed of the body of water. The system may further comprise a ballast subsystem configured to rest on the bed of the body of water; a plurality of tethering points disposed on the fluid containment subsystem; and at least one tether attaching the ballast subsystem to at least one of the plurality of tethering points; wherein the weight of the ballast subsystem is greater than a buoyant force acting on the fluid containment subsystem.

The compressed fluid energy storage system may comprise multiple submersible fluid containment subsystems. At the level of an individual fluid containment subsystem, the system may therefore comprise a further compressed fluid conduit and a further submersible fluid containment subsystem, wherein the fluid containment subsystem in fluid communication with the compressor is in fluid communication with the further containment subsystem via the further compressed fluid conduit. The region of the fluid containment subsystem joined to the compressed fluid conduit may be rigid. The rigid region may comprise polyvinyl chloride or other materials resistant to saltwater.

The compressed fluid energy storage system may further comprise a substantially continuous barrier wall disposed on the bed of the body of water around the fluid containment subsystem and the barrier wall may be comprised of, for example, New Jersey barriers.

The domed portion of the fluid containment subsystem may be a flexible fluid storage portion and the material of the fluid storage portion may be a flexible membrane. The flexible membrane may comprise a composite material. The composite material may comprise a fluid containment subsystem within the body of water; a compressor disposed in fluid communication with the fluid containment subsystem and configured to supply compressed working fluid to the fluid containment subsystem; an expander disposed in fluid communication with the fluid containment subsystem and configured to (i) receive compressed working fluid from the fluid containment subsystem and (ii) expand the compressed working fluid; and a fluid conduit disposed to place the fluid containment subsystem in fluid communication with the compressor and the expander. The system may further comprise a tensegrity structure disposed to entrap the fluid containment subsystem, wherein the ballast subsystem rests on the tensegrity structure. The tensegrity structure may be a hexagonal tensegrity structure. The tensegrity structure may be disposed to restrain the fluid containment subsystem at at least six points on an upper surface of the fluid containment subsystem. The fluid containment subsystem may be open at the bottom and be fastened to either the bed of the body of water or the base of the tensegrity structure.

In a further aspect, a method for deployment of the compressed fluid energy storage comprises transporting a fluid containment subsystem with a compressed fluid conduit attached to a location for the fluid containment subsystem without ballast or compression energy fluid; lowering the fluid containment subsystem to a bed of a body of water at the location using sufficient ballast to counter natural buoyancy; configuring the compressed fluid conduit between the fluid containment subsystem and a compressor and expander; attaching a part of the compressed fluid conduit remaining on the surface of the body of water to a support to impart a catenary shape to the compressed fluid conduit; injecting ballast material into the fluid containment subsystem as a slurry; and pumping compressed energy fluid via the compressed fluid conduit to the fluid containment subsystem. The lowering the fluid containment subsystem to a bed of the body of water may comprise disposing ballast materials on the bed of the body of water; and controllably pulling the fluid containment subsystem to the bed of the body of water.

In another aspect, a submersible fluid containment subsystem is disposed longitudinally along a vertical axis when submerged and ballasted with internally disposed ballast materials in a body of water and charged with a compressed working fluid, the fluid containment system comprising a substantially flat portion closing a domed portion, wherein (a) the fluid containment subsystem comprises at least one exchange portal disposed in a shell of the fluid containment subsystem at a distance along the vertical axis from the substantially flat portion; and (b) the domed portion proximate the substantially flat portion has a taper from a perimeter of the substantially flat portion towards the vertical axis. The taper may be based on the density of the ballast materials and on the distance. The taper may be large enough to counter a collapsing action of the ballast materials on a lower portion of the domed portion when a volume of the compressed working fluid in the fluid containment subsystem is low.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DETAILED DESCRIPTION

The embodiments disclosed below are not intended to be exhaustive or limit the invention to the precise form disclosed in the following detailed description. Rather, the embodiments are chosen and described so that others skilled in the art may utilize their teachings. U.S. patent application Ser. No. 12/888,971 filed 23 Sep. 2010 relates to the present specification and its disclosure is hereby incorporated in the present specification. The following United States Provisional Patent applications, namely U.S. Provisional Application 61/245,279 filed Sep. 23, 2009; U.S. Provisional Application 61/309,415 filed Mar. 1, 2010; U.S. Provisional Application 61/364,364 filed Jul. 14, 2010; and U.S. Provisional Application 61/364,368 filed Jul. 14, 2010 also all related to the present invention and their disclosures are hereby incorporated in the present specification.

The term "fluid" is used in the present specification to describe any compressible gas or liquid such as for example without limitation air, CO2, or the like, including a supercritical fluid. In the present specification, the acronym "CAES" is used to describe not just compressed air energy storage systems, but also the more general compressed fluid energy storage systems. The term "body of water" is used in the present specification to describe for example without limitation an ocean, sea, lake, reservoir, gulf, harbor, inlet, river, or any other manmade or natural body of depth great enough to generate useful hydrostatic pressure by virtue of gravity. The term "sediment" is used in the present specification to describe marine material from the bed, floor or bottom the body of water and may include, by way of example, gravel, sand, silt, clay, mud, organic or other material settled onto the bed, floor or bottom of the body of water.

Figure 1:
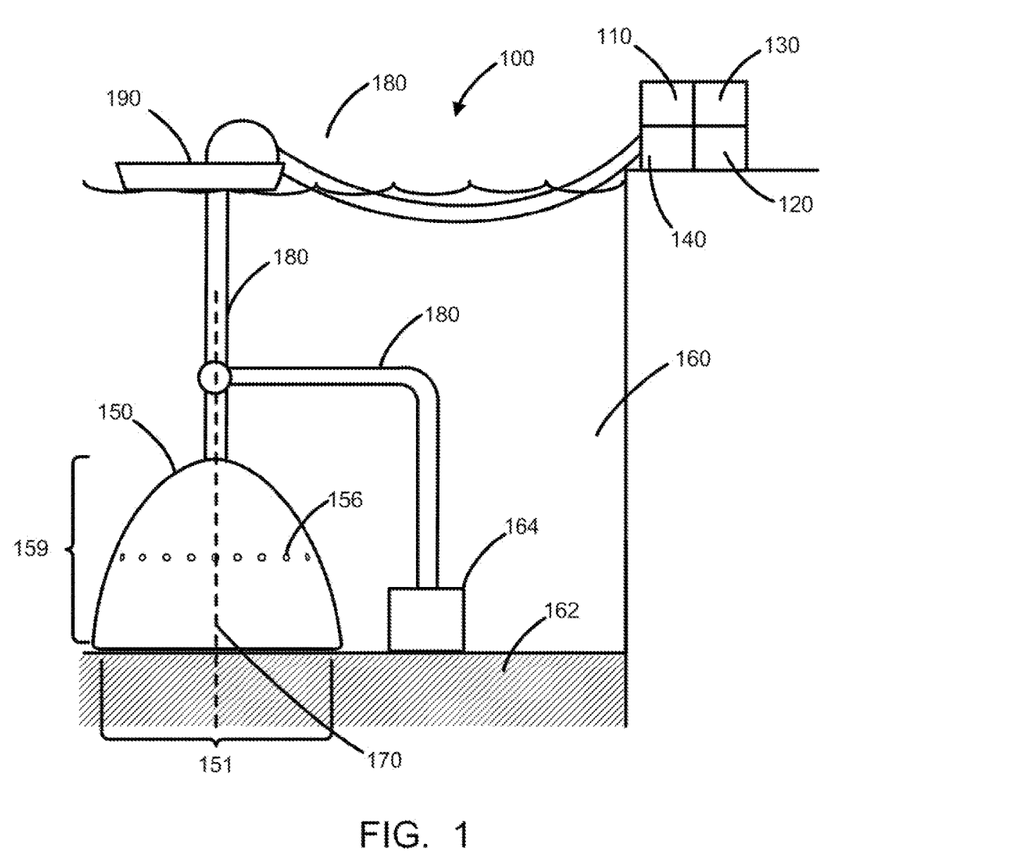
FIG. 1 shows a compressed fluid energy storage system.
Figure 2:
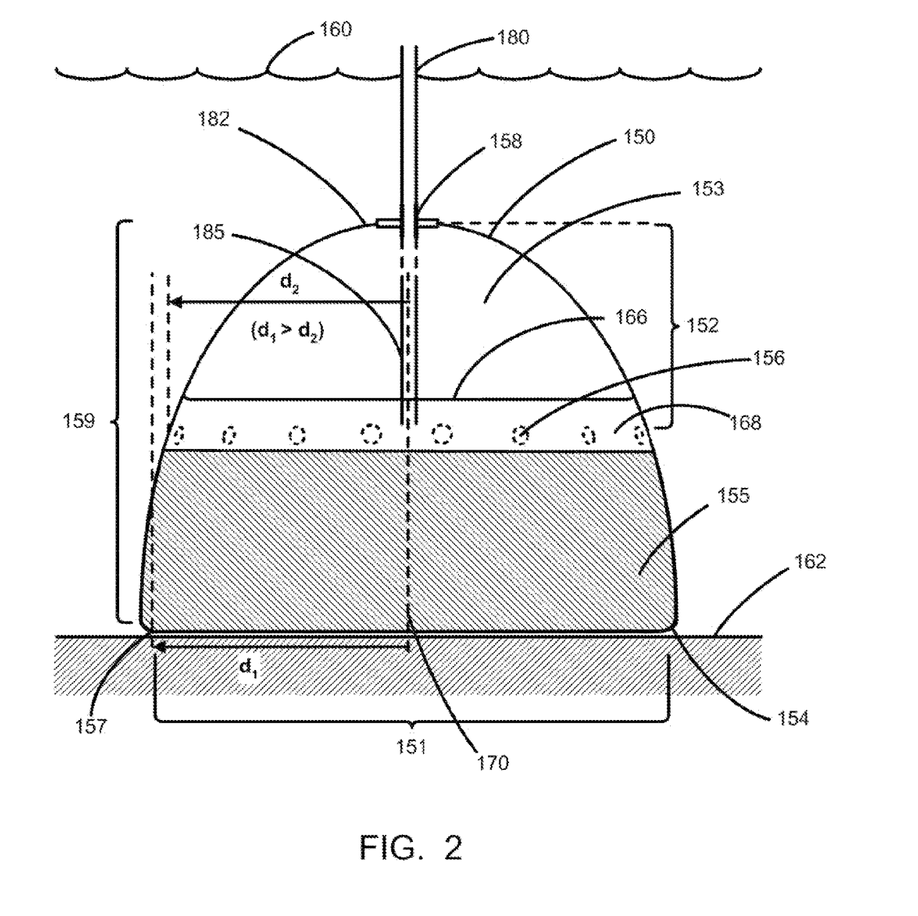
FIG. 2 shows part of FIG. 1 in more detail.

The present specification provides in a first embodiment a compressed fluid energy storage (CAES) system 100, as shown in FIG. 1, and in more detail in FIG. 2. CAES system 100 comprises a compressor 110 for compressing a working fluid, an expander 120 for expanding the fluid and generate thereby electric power in a suitable generator 130 driven by the expander 120. A suitable manifold shut-off valve 140 places either compressor 110 or expander 120 in fluid communication with submersible fluid containment subsystem 150 located on or proximate the bed 162 of body of water 160, or shuts off all fluid communication between containment subsystem 150 and both compressor 110 and expander 120. Containment subsystem 150 is disposed longitudinally along a vertical axis 170 when submerged and ballasted in body of water 160 and charged with a compressed working fluid. Fluid containment subsystem 150 is at least in part flexible.

Compressed fluid flows from fluid containment subsystem 150 to generator 130, or from compressor 110 to fluid containment subsystem 150 via compressed fluid conduit 180 and manifold shut-off valve 140. One skilled in the art will recognize that a compressed fluid storage vessel must be ballasted or anchored so it doesn't float to the surface when inflated with compressed working fluid. In different embodiments, fluid containment subsystem 150 is ballasted either by ballast material within its own volume 155, or by a separate ballast subsystem, both of which are described in more detail below. A volume of compressed working fluid in the fluid containment subsystem 150 is stored nearly isobarically as a function of the amount of fluid therein and as a function of the depth of the fluid containment subsystem 150 within body of water 160. The hydrostatic pressure of surrounding water is the predominant restraining parameter for the compressed fluid, which is pressurized into the fluid containment subsystem 150 via a compressor 110, valve 140, and compressed fluid conduit 180. Compressor 110 and expander 120 may be disposed underwater, or outside the body of water either on land, sea or in the air.

We turn now to the flexible submersible fluid containment subsystem 150 located on or proximate the bed 162 of body of water 160. To the extent that the fluid containment subsystem 150 is flexible, its precise shape is dictated by various factors, including its manufactured shape, its depth within the body of water and associated hydrostatic pressure, the amount of compressed fluid within its volume, and by whatever ballast arrangement is used to weigh it down. It is furthermore affected by how and where the ballast weight is applied to containment subsystem 150. Despite the variation based on these listed factors, the submerged fluid containment subsystem 150 comprises, when charged with the compressed working fluid and suitably ballasted, a substantially flat portion 151 closing a substantially paraboloid, ellipsoidal, or conically shaped portion, which we refer to in this specification as the "domed portion" 159, and is disposed longitudinally along a vertical axis under these conditions. In some embodiments, the flat portion 151 may be substantially circular. The internal volume of fluid containment subsystem 150 comprises a fluid storage portion 152 generally in the top of the domed portion 159. The shell of fluid containment subsystem 150 may comprise, at least in part, a flexible membrane, for example a composite, polymer membrane comprising glass fibers and polyethylene matrix. Other strong polymers to consider include polyurethane, carbon, acrylic, acrylene, glass, polyester, etc. The fluid storage portion 152 may be specifically flexible.

The term "shell" is used here to describe the portion of the fluid containment subsystem 150 that separates the internal volume of the fluid containment subsystem 150 from the body of water 160. The term "substantially paraboloid, ellipsoidal, or conically shaped" is used in the present specification to describe the hollow three-dimensional shape of the domed portion that has substantial rotational symmetry about a longitudinal axis and is either substantially conic in shape, or approximates in cross-section along that longitudinal axis a parabola, or approximates a portion of a hemisphere of an ellipsoid having the longitudinal axis as semi-major axis. It is to be particularly understood that, when in operation, the domed portion 159 may exhibit convex deformation under pressure from the compressed working fluid stored within it, thereby deviating the shape from that of a pure conic section. Similarly, it may exhibit deformation when underinflated with compressed working fluid.

The substantially circular flat portion may be at least in part an oblate ellipsoid or oblate paraboloid and may be completely flat over a substantial part of the bottom. It is to be particularly understood that, when in operation, the substantially circular flat portion may exhibit deformation under pressure from materials or gasses contained within it. In this way a substantially oblate ellipsoid or oblate paraboloid "circular flat portion" may be flattened over a substantial fraction of its surface.

The substantially circular flat portion 151 is joined to the domed portion 159 by a transition portion 154 that varies in space from the circular flat portion 151 to the domed portion 159 and is everywhere contiguous with both the flat portion 151 and the domed portion 159.

In more general embodiments, fluid containment subsystem 150 can comprise more general spheroidal, oblate spheroidal, ellipsoidal, droplet-like, or other rectilinear or other simply connected shapes.

Fluid containment subsystem 150 comprises at least one exchange port 156 disposed in the shell of the fluid containment subsystem 150 for allowing the ingress of water from the body of water 160 into the fluid containment subsystem 150 and for allowing the egress of water and materials from the fluid containment subsystem 150 to the external body of water 160. As fluid containment subsystem 150 is filled with compressed working fluid, the fluid, being less dense than the surrounding water, takes up residence in the fluid storage portion 152 and the lower limit of the bubble 153 of compressed working fluid extends downward ever further. The vertical pressure due to the density difference between the compressed working fluid and the surrounding water deforms the fluid storage portion 152 in this process. When the lower limit 166 of the bubble of compressed working fluid reaches the at least one exchange port 156, excess compressed working fluid is vented through the at least one exchange port 156. In FIGS. 1 and 2, a number of exchange ports 156 are shown. The exchange port(s) 156 may be disposed in the shell of the fluid containment subsystem 150 below a vertical location corresponding to a predetermined lowest location to be occupied by compressed energy fluid bubble 153 in the fluid containment subsystem 150.

In particular, in some embodiments, the at least one exchange port(s) 156 may be disposed in the shell of the fluid containment subsystem 150 radially at a distance d2 substantially closer to the vertical axis 170 of fluid containment subsystem 150 than a smallest radial distance d1 from the vertical axis 170 at which the flat portion 151 exhibits substantial vertical curvature. That point of curvature 157 of flat portion 151 is indicated in FIG. 2. This specific arrangement prevents the ballast material from collapsing the lower portion of the domed portion 159 and thereby effectively collapsing the flexible structure of fluid containment subsystem 150 as a whole.

When there is very little vertical tension in the dome portion 159, a potential exists for the lower portion of the dome portion 159 to collapse under the pressure of ballast materials 155. Such a situation may pertain during the early phases of injection of compressed energy fluid into subsystem 150 when there may be very little compressed energy fluid present in compressed energy fluid bubble 153, while a substantial load of ballast material 155 might be present. The shape of the lower portion of fluid containment subsystem 150 has to be of such shape as will assist in preventing collapse under these circumstances.

When the compressed energy fluid bubble 153 in fluid storage portion 152 is at its maximum capacity, the vertical forces in the shell of the dome portion 159 will be large, and the amount of ballast materials 155 in the lower portion of subsystem 150 has to be sufficient to counterbalance those forces to keep subsystem 150 submerged. This requirement argues for a large amount of ballast materials 155 within the confines of the lower portion of subsystem 150, increasing thereby the potential for collapse of the lower portion of the dome portion 159 if the injection of compressed energy fluid is near a minimum while ballast is near a maximum. These considerations define conditions upon the shape of the lower portion of dome portion 159.

To ensure that the introduction of extra compressed fluid to the vessel does not exceed the downward ballast force, the location of the exchange ports and the shapes of the upper and lower portions of the vessel are selected to preclude this possibility. Changing levels of compressed energy fluid in the fluid storage portion 152 change the vertical tension in dome portion 159. Considerable variation in the tension can substantially change the shape of the overall fluid containment subsystem 150. Higher tension, associated with the storage of more energy storage fluid, tends to move point of curvature 157 in towards the vertical axis 170 and correspondingly increases the amount of downward force on the shell of fluid containment subsystem 150 radially outboard of point 157.

The shape of the sidewall of the lower portion of subsystem 150 can affect whether that sidewall is changing position substantially as a function of the amount of compressed energy fluid in the fluid storage portion 152. If the sidewall shape is such that the upward force on the sidewall in the region below and proximate the exchange ports 156 is similar or greater than the downward force on the sidewall proximate and outboard of point of curvature 157, then a relatively stable shape for the lower portion of subsystem 150 can be maintained, independent of the amount of compressed fluid in the vessel. As a result, the sidewall does not collapse vertically when there are only small amounts of compressed energy fluid in the fluid storage portion 152, as will occur during charging of the system with working fluid from a substantially empty state, or when the working fluid is extracted to very low levels. This also allows considerable freedom in the exact shape of the upper portions of fluid containment subsystem 150. In view of the above, if the radial location d2 is substantially inboard of the radial location d1, then the forces generated by the ballast, which is denser than the water, maintains the generally vertical orientation of the sidewall for the full range of compressed energy fluid levels that may occur. The location of the exchange ports 156 directly affects the height, and thereby the weight, of the ballast materials 155 in fluid containment sub system 150.

The flat portion 151 and the lower portion of the dome portion 159 below the at least one exchange port 156, may be viewed as being vertically tapered substantially inward to the vertical axis 170. The degree of taper is based on the height above the flat portion of the at least one exchange port 156, and on the density of the ballast materials 155 and is chosen to be sufficient to counter the collapse of the lower portion of the dome portion 159 in case of low working fluid volume in the fluid storage portion 152. Submersible fluid containment subsystem 150 may be viewed as disposed longitudinally along vertical axis 170 when submerged and ballasted with internally disposed ballast materials 155 in body of water 160 and charged with a compressed working fluid in fluid storage portion 152, fluid containment system 150 comprising substantially flat portion 151 closing domed portion 159, wherein (a) fluid containment subsystem 150 comprises at least one exchange portal 156 disposed in a shell of fluid containment subsystem 150 at a distance along vertical axis 170 from substantially flat portion 151; (b) domed portion 159 proximate substantially flat portion 151 has a taper from a perimeter of substantially flat portion 151 towards vertical axis 171; and (c) the taper is based on a density of the ballast materials 155 and on the distance. The taper is large enough to counter a collapsing action of the ballast materials on a lower portion of the domed portion when a volume of the compressed working fluid in the fluid containment subsystem is low.

Fluid containment subsystem 150 further comprises a first inlet-outlet port 158 configured for placing the fluid containment subsystem in fluid communication with the compressor and the expander. First inlet-outlet port 158 may be located in a variety of positions on fluid containment subsystem 150, though one particularly useful location is at the vertical apex 182 of the domed portion 159 of the fluid containment subsystem 150 containing the compressed energy fluid bubble 153.

In a first general embodiment, the ballast for the fluid containment subsystem 150 comprises ballast material 155 within the fluid containment subsystem 150, the ballast material 155 resting on the flattened bottom of fluid containment subsystem 150. The ballast material 155 may be supplied via compressed fluid conduit 180. In other embodiments the ballast material 155 may be supplied via a separate ballast supply conduit (not shown). The ballast material may be sediment from the bed 162 of the body of water 160 proximate fluid containment subsystem 150. To this end a submersible pump 164 may be located proximate fluid containment subsystem 150 to ingest sediment and supply it via sediment conduit 168 and compressed fluid conduit 180 or the separate ballast supply conduit (not shown). If suitable ballast is not available locally, it may be sourced elsewhere, transported by surface vessel to the location of fluid containment subsystem 150, and supplied to fluid containment subsystem 150 via compressed fluid conduit 180. Sediment ballast may be pumped into the fluid containment subsystem 150 as a slurry. In one embodiment a fine aggregate such as sand has the ability to be pumped in a water aggregate slurry for rapid and continuous filling. Excess ballast slurry will spill through exchange port(s) 156.

It will be understood that, with compressed fluid bubble 153 confined to fluid storage portion 152 of containment subsystem 150, and with the ballast material 155 substantially confined to the portion of containment subsystem 150 below the exchange port(s) 156, a layer of water 168 exists in the general vicinity of exchange port(s) 156. This leads to an embodiment in which containment subsystem 150 is not a contiguous "monocoque" closed structure, but instead comprises separate upper and lower portions bearing fittings that allow the upper and lower portions be engaged with each other. The spaces between the fittings then serve the same function as exchange port(s) 156 of FIG. 1 and FIG. 2. This is made possible by the fact that the general region of exchange port(s) 156 has no confinement role with respect to either ballast or compressed energy fluid, but, rather, assist in balancing the hydrostatic pressure inside and outside containment subsystem 150 in the region between the ballast material 155 and the compressed fluid bubble 153.

Compressed fluid conduit 180 may be one or more of flexible, semi-flexible, and jointed. CAES system 100 may comprise a support 190 on the body of water 160 for supporting the compressed fluid conduit 180 at least one point to impart to the compressed fluid conduit 180 a catenary shape.

The compressed energy fluid bubble 153 in fluid containment subsystem 150 may be linked to another compressed energy fluid bubble in a further fluid containment subsystem 150' by a further compressed fluid conduit. This allows for a plurality of fluid containment subsystems 150 to be operated in series. Alternatively, a plurality of fluid containment subsystems may be linked independently to compressor 110 for and expander 120 in order to operate the plurality of fluid containment subsystems in parallel. According to one embodiment of the invention, compressed fluid storage systems may be configured in a modular fashion to allow portions of the overall system to be temporarily shut down for maintenance, or repair, or permanently decommissioned, without having to shut down the overall system.

Fluid containment subsystem 150 may further comprise a flushing conduit 185 connected to the first inlet-outlet port inside the fluid containment subsystem and directed to the ballast material within the fluid containment subsystem, the flushing conduit 185 disposed for using water to flush ballast material 155 from the fluid containment subsystem through at least one of the exchange ports 156 into the body of water 160.

Figure 3:
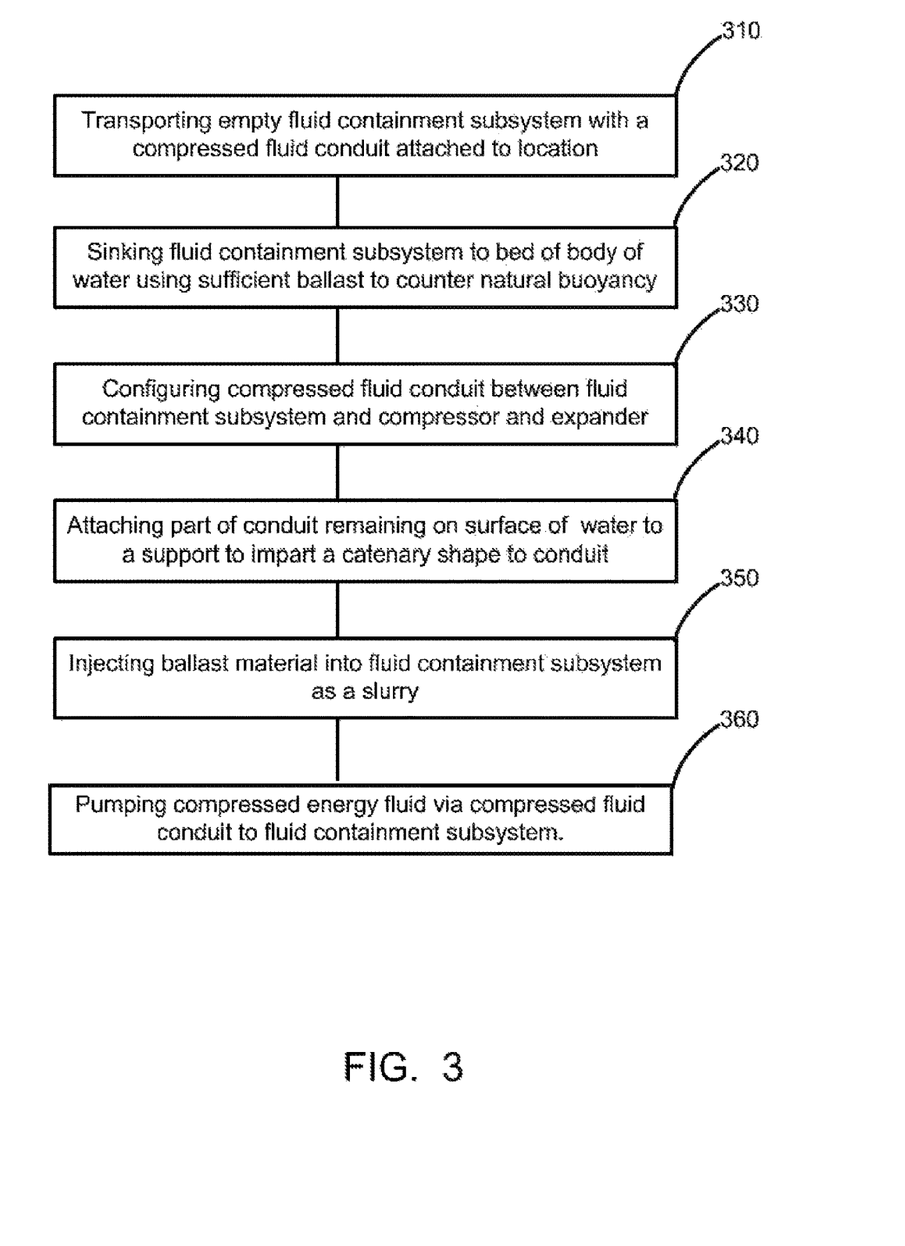
FIG. 3 shows a flow chart for a method of deploying a compressed fluid energy storage system

In a further aspect, a method for deployment of, for example, the compressed fluid energy storage (CAES) system 100, comprises, as shown in FIG. 3, transporting [310] fluid containment subsystem 150, with compressed fluid conduit 180 attached, to the location for fluid containment subsystem 150 without ballast or air, lowering [320] fluid containment subsystem 150 to the bed 162 of a body of water 160 using enough ballast to counter natural buoyancy. The lowering may be, for example without limitation, by first disposing ballast materials on the bed 162 of the body of water 160 and then controllably pulling the fluid containment subsystem 150 to the bed 162 of the body of water 160.

Compressed fluid conduit 180 is configured [330] between fluid containment subsystem 150 and compressor 110. The part of compressed fluid conduit 180 remaining on the surface of body of water 160 is attached [340] to support 190 to impart a catenary shape to compressed fluid conduit 180.

Compressed fluid conduit 180 may be weighted in a distributed way along its surface length, for example from shore. Alternatively, the hose can be ballasted to be heavier than water during first half of the hose from the surface to approximately the midpoint, which forms a catenary shape. The second half of the hose is buoyant from the approximate midpoint to the sea floor, where fluid containment subsystem 150 is disposed, for an inverse catenary to result in an S shape that extends and is resilient to shifting winds and currents and boat/platform movements.

Once fluid containment subsystem 150 is deployed and configured on the bottom of the body of water 160, ballast is injected [350] into fluid containment subsystem 150 as a slurry, either from the bed 162 of the body of water 160 proximate containment subsystem 150 via compressed fluid conduit 180 using the submersible pump 164, or from a surface vessel via compressed fluid conduit 180. Overfilled sediment spills out of fluid containment subsystem 150 via exchange port(s) 156 onto the bed 162 of body of water 160.

In this way, the bottom portion of fluid containment subsystem 150 is ballasted with sediment, while the top portion is not filled with sediment due to the holes.

Once this process is complete, air is pumped [360] via compressed fluid conduit 180 down to fluid containment subsystem 150. The air is stored in fluid storage portion 152 of fluid containment subsystem 150. The overfill air goes out via exchange port(s) 156, protecting fluid containment subsystem 150 from overcapacity or overpressure. By monitoring the exact pressure of the system when air is not flowing, the fill level of fluid containment subsystem 150 can be determined, and its percentage full or empty can be determined as well.

In one embodiment, connection fittings can connect a top portion of fluid containment subsystem 150 to a bottom portion of fluid containment subsystem 150. Spaces between the fittings can serve as exchange port(s). Divers or Remote Operating Vehicles (ROVs) can attach or remove fittings for maintenance as needed to separate the top portion from the bottom portion. Meridional slices can be attached to each other for construction of fluid containment subsystem 150. They can be melted, fused, glued, stitched or seamed together. The seams can be waterproofed. The compressed fluid conduit 180 may engage with inlet-outlet port 158 at the apex of the fluid containment sub system 150.

If it is desired to retrieve fluid containment subsystem 150, water may be blown down compressed fluid conduit 180 and through flushing conduit 185, directing a jet of water towards the ballast 155. A sufficiently forceful application of water will entrain the ballast 155 and cause the ballast 155 to flow out of fluid containment subsystem 150 via exchange port(s) 156. Once sufficient ballast 155 has been emptied, the vessel is once again filled with air. The air lifts the vessel off the seafloor, since it is no longer ballasted, and lifts it to the surface. Excess air of expansion will leak out the exchange port(s) 156, ensuring no excess pressure build-up.

It is also possible to have a drawstring or line or cord through an air hose (not shown) that is connected, for example, near the bottom of fluid containment subsystem 150 and is drawn up to better direct the air hose water jet onto the ballast 155 to divert some of the sand from the vessel to the outside. During emptying, the drawstring tension is applied, shortening the drawstring and bringing the air hose near the bottom of fluid containment subsystem 150.

There are two first-order structural forces at work on fluid containment subsystem 150. The buoyancy force due to the air in the fluid storage portion 152 of fluid containment subsystem 150 creates vertical stress in the membrane. The weight of the ballast in the bottom of fluid containment subsystem 150 provides the opposing force in the lower portion of fluid containment subsystem 150. Vertical fiber-reinforced fabric orientations can react these primary stresses against each other with minimal amounts of material. The apex of fluid containment subsystem 150 may comprise a PVC flange or other material.

As air is pumped from the surface down into fluid containment subsystem 150, the interface of air to water 166 descends. The hydrostatic pressure can be measured at the surface as a function of time until it levels off, indicating that surplus air is being released through exchange port(s) 156 to the surface. Thus the pressure can provide a detailed indication of the fill level of fluid containment subsystem 150.

Figure 4:
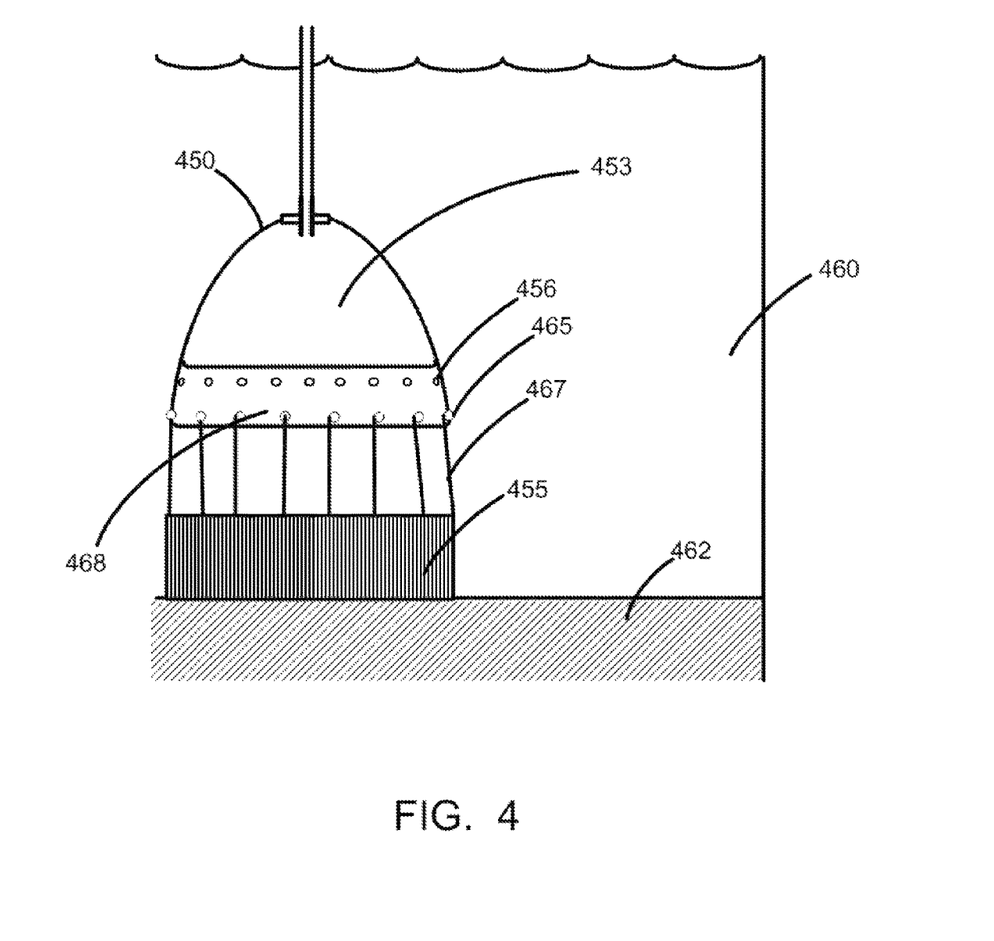
FIG. 4 shows another embodiment of a compressed fluid energy storage system

In a further embodiment shown in FIG. 4, a fluid containment subsystem 450 for use in a compressed fluid energy storage (CAES) system of the general type described at the hand of in FIG. 1 may comprise a separate ballast subsystem 455 for ballasting the fluid containment subsystem 450 proximate a bed 462 of body of water 460. Fluid containment subsystem 450 is taken to be of the general type described at the hand of FIG. 1. For the sake of clarity, all equipment beyond fluid containment subsystem 450 is omitted from FIG. 4. In this embodiment, there is no substantial amount of ballast materials in fluid containment subsystem 450. The ballast subsystem is configured to rest on the bed 462 of the body of water 460. A plurality of tethering points 465 are disposed on the fluid containment subsystem 450 and allow at least one tether 467 to attach the ballast subsystem 455 to at least one of the plurality of tethering points 465. The weight of the ballast subsystem 455 is chosen to be greater than the buoyant force acting on the fluid containment subsystem 450. It is clear that this configuration allows the compressed energy fluid bubble 453 to extend much further down into fluid containment subsystem 450 than in the configuration of FIGS. 1 and 2. The exchange ports 456 can therefore be positioned lower down the dome portion of fluid containment subsystem 450. The balance of the volume within containment subsystem 450 is taken up largely by water 468.

Figure 5:
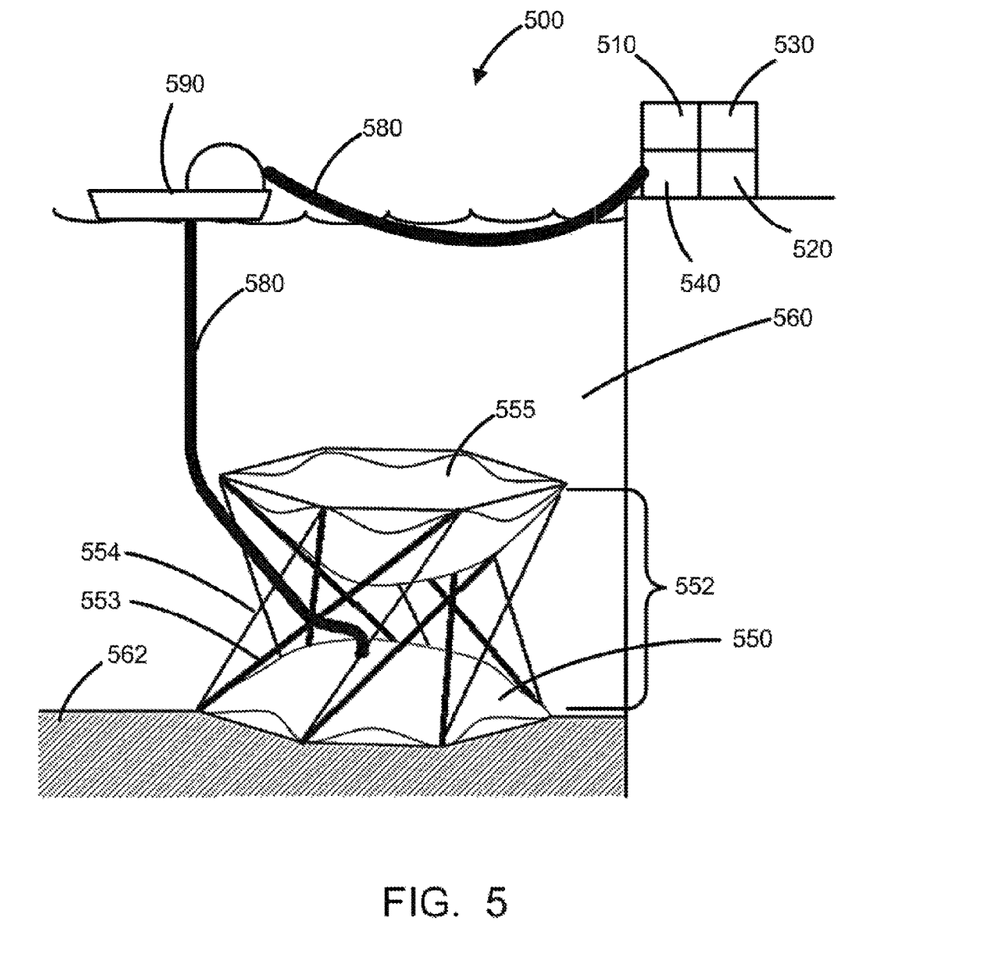
FIG. 5 shows a compressed fluid energy storage system based on a tensegrity structure.

In another embodiment, shown in FIG. 5, a compressed fluid energy storage system 500 comprises a flexible fluid containment subsystem 550 submersible in a body of water 560; a separate ballast system 555 disposed above the submersible fluid containment subsystem 550 within the body of water 560; a compressor 510 disposed in fluid communication with the fluid containment subsystem 550 and configured to supply compressed working fluid to the fluid containment subsystem 550; an expander 520 disposed in fluid communication with the fluid containment subsystem 550 and configured to receive compressed working fluid from the fluid containment subsystem 550 and expand the compressed working fluid to generate thereby electric power in a suitable generator 530 driven by the expander 520; and a fluid conduit 580 disposed to place the fluid containment subsystem 550 in fluid communication with the compressor 510 and the expander 520. A suitable manifold shut-off valve 540 places either compressor 510 or expander 520 in fluid communication with submersible fluid containment subsystem 550 located on or proximate the bed 562 of body of water 560, or shuts off all fluid communication between containment subsystem 550 and both compressor 510 and expander 520. Compressor 510 and expander 520 may be disposed underwater, or outside the body of water either on land, sea or in the air.

System 500 may comprise a support 590 on the body of water 560 for supporting the compressed fluid conduit 580 at least one point to impart to the compressed fluid conduit 580 a catenary shape. The fluid containment subsystem 550 can be entirely composed of reinforced polymer fabric.

The system 500 may further comprise a tensegrity structure 552 disposed to entrap the fluid containment subsystem 550. The tensegrity structure 552 may be comprised of compression members 553 and tension members 554. In particular, the ballast subsystem 555 may rest on the tensegrity structure 552. The tensegrity structure may be selected to allow close-packing, stability and other advantages. The tensegrity structure may be composed of Fiber-crete compressional bars. By way of non-limiting example shown in FIG. 5, the tensegrity structure 552 may be a hexagonal tensegrity structure, and restrains the fluid containment subsystem 550 at at least six points on the upper surface of the fluid containment subsystem 550. In one embodiment, shown in FIG. 5, the fluid containment subsystem 550 is open at the bottom and is fastened to the bed 562 of the body of water 560 or to the base of the tensegrity structure 552. A plurality of hexagonal tensegrity structures 552 can be placed in a close-packed arrangement, filling the area of the bed 562 of the body of water 560. This increases stabilization of the structures against overturning. The tensegrity structures 552, and especially arrays of them, can hold large amounts of compressed working fluid and ballast. Arrays of tensegrity structures 552 comprise a strong and lightweight structure. Sediment may be employed as ballast material and may be dredged and dropped by a barge. Alternatively, local sediment in the vicinity of the tensegrity structure 552 may be pumped into ballast subsystem 555 using a submersible pump (not shown).

The disclosed compressed fluid energy storage systems have cost advantages and/or allow systems to be operated with significant cost advantages in locations currently used for underwater compressed air energy storage as well as locations not previously economically exploitable with prior art CAES components and systems. Ballast materials for use in the various embodiments can be sediment, including in-situ sediment, which may include for example gravel, sand, silt, clay, mud, organic or other material settled onto the floor of the sea. Other ballast materials can be aggregate, concrete or a hybrid such as concrete and sediment, steel and sediment, or steel, concrete and sediment.

Aggregate can be brought from shore, either be being pumped in through an air hose or brought by ship or barge to the location and pumped into the ballast containment feature (air vessel or ballast compartment). The piping and air hoses must carry the weight of sediment-loaded water without disturbing the orientation of the fluid containment subsystem to weight and mass flow thrust. Concrete can be cast either onshore, offshore on a ship or vessel, or underwater. If cast onshore the form can remain on the concrete piece, e.g. using culvert piping as casting. Hybrid forms using combinations of these materials may also be used. One hybrid is to use concrete and sediment. Another hybrid is to use steel and sediment. Yet another hybrid is to use steel, concrete, and sediment. These variations offer advantages in ballast material cost which can be optimized for any specific location. The cost of ballast delivery to its final location can also be optimized for sites depending on their specific conditions by using one or more of these variations. For example, the use of an axisymetric design for the fluid containment subsystem that can be ballasted from a single point with overflow features generally insures a pragmatically uniform and sufficient depth of ballast exists over the lower section of the fluid containment subsystem.

The approach to deployment and its function, as described in this specification, offers a tremendous cost advantage for embodiments, which do not require remotely piloted equipment and/or where the needed equipment is modest in scale. Deployment costs are also determined by the choice of material and can be significantly reduced by using in situ sediment. This ballast-to-air compartment structure and technique offers is efficient and therefore offers an advantage in cost. It is also extremely robust, as explained below. An even greater cost advantage is realized if no remotely piloted equipment is needed or if ROV use is minimized. The fluid containment subsystems and their deployment with air hoses and ballast is additionally robust by providing resistance to water currents, marine life attack through e.g. encrustation or biting, corrosion, sabotage, and/or inadvertent problems such as fishing equipment entanglement. A barrier wall may be disposed on the bed of the body of water around the fluid containment subsystem to form a substantially continuous barrier around the fluid containment subsystem. For example, an energy storage region on the seafloor may be protected from bottom trawling by a perimeter of New Jersey concrete barriers or suitable equivalent.

Therefore, according to one embodiment of the invention, a compressed fluid energy storage system is provided comprising a submersible fluid containment subsystem disposed longitudinally along a vertical axis when submerged and ballasted in a body of water and charged with a compressed working fluid, the fluid containment system comprising a substantially flat portion closing a domed portion; a compressor disposed in fluid communication with the fluid containment subsystem and configured to supply compressed working fluid to the fluid containment subsystem; and an expander disposed in fluid communication with the fluid containment subsystem and configured to receive compressed working fluid from the fluid containment subsystem and expand the compressed working fluid; wherein the fluid containment subsystem is at least in part flexible.

According to another embodiment of the invention, a submersible fluid containment subsystem is disposed longitudinally along a vertical axis when submerged and ballasted with internally disposed ballast materials in a body of water and charged with a compressed working fluid, the fluid containment system comprising a substantially flat portion closing a domed portion, wherein (a) the fluid containment subsystem comprises at least one exchange portal disposed in a shell of the fluid containment subsystem at a distance along the vertical axis from the substantially flat portion; and (b) the domed portion proximate the substantially flat portion has a taper from a perimeter of the substantially flat portion towards the vertical axis. The taper may be based on the density of the ballast materials and on the distance. The taper may be large enough to counter a collapsing action of the ballast materials on a lower portion of the domed portion when a volume of the compressed working fluid in the fluid containment subsystem is low.

According to yet another embodiment of the invention, a compressed fluid energy storage system comprises a flexible fluid containment subsystem submersible in a body of water; a separate ballast system disposed above the submersible fluid containment subsystem within the body of water; a compressor disposed in fluid communication with the fluid containment subsystem and configured to supply compressed working fluid to the fluid containment subsystem; an expander disposed in fluid communication with the fluid containment subsystem and configured to receive compressed working fluid from the fluid containment subsystem and expand the compressed working fluid; and a fluid conduit disposed to place the fluid containment subsystem in fluid communication with the compressor and the expander.

According to yet still another embodiment of the invention, a method for deployment of the compressed fluid energy storage comprises transporting a fluid containment subsystem with a compressed fluid conduit attached to a location for the fluid containment subsystem without ballast or compression energy fluid; lowering the fluid containment subsystem to a bed of a body of water at the location using sufficient ballast to counter natural buoyancy; configuring the compressed fluid conduit between the fluid containment subsystem and a compressor and expander; attaching a part of the compressed fluid conduit remaining on the surface of the body of water to a support to impart a catenary shape to the compressed fluid conduit; injecting ballast material into the fluid containment subsystem as a slurry; and pumping compressed energy fluid via the compressed fluid conduit to the fluid containment subsystem. The lowering the fluid containment subsystem to a bed of the body of water may comprise disposing ballast materials on the bed of the body of water; and controllably pulling the fluid containment subsystem to the bed of the body of water.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A compressed fluid energy storage system comprising:
   a. a submersible fluid containment subsystem disposed longitudinally along a vertical axis when submerged and ballasted on a bed of a body of water and charged with a compressed working fluid, the fluid containment system comprising a substantially flat portion closing a domed portion, with the flat portion presenting a bottom surface of the fluid containment system that makes contact with the bed of the body of water;
   b. a compressor disposed in fluid communication with the fluid containment subsystem and configured to supply compressed working fluid to the fluid containment subsystem; and
   c. an expander disposed in fluid communication with the fluid containment subsystem and configured to:
      i. receive compressed working fluid from the fluid containment subsystem; and
      ii. expand the compressed working fluid;
   wherein the fluid containment subsystem is at least in part flexible.

2. The system of claim 1, further comprising at least one exchange port disposed generally in a shell of the fluid containment subsystem for allowing the ingress of water from the body of water into the fluid containment subsystem and for allowing the egress of water and materials from the fluid containment subsystem to the body of water.

3. The system of claim 2, wherein the at least one exchange port is disposed in the shell of the fluid containment subsystem below a vertical location, the vertical location corresponding to a predetermined lowest location to be occupied by compressed energy fluid in the fluid containment subsystem.

4. The system of claim 2, wherein the at least one exchange port is disposed in the shell of the fluid containment subsystem radially substantially closer to the vertical axis than a smallest radial distance from the vertical axis at which the flat portion exhibits substantial vertical curvature when the fluid containment system contains a smallest volume of working fluid.

5. The system of claim 2, wherein the fluid containment subsystem further comprises a first inlet-outlet port configured for placing the fluid containment subsystem in fluid communication with the compressor and the expander.

6. The system of claim 5, further comprising ballast material disposed within a lower portion of the fluid containment subsystem.

7. The system of claim 6, wherein the ballast material is sediment from the bed of the body of water.

8. The system of claim 6, further comprising a flushing conduit connected to the first inlet-outlet port inside the fluid containment subsystem and directed to the ballast material within the fluid containment subsystem, the flushing conduit disposed for using water to flush ballast material from the fluid containment subsystem through an exchange port into the body of water.

9. The system of claim 8, wherein the flushing conduit is perforated proximate the inlet-outlet port.

10. The system of claim 6, wherein the inlet-outlet port is disposed at a vertical apex of the fluid containment subsystem and the vertical apex is directed upward.

11. The system of claim 10, wherein the at least one exchange port is disposed in the shell of the fluid containment subsystem radially substantially closer to the vertical axis than a smallest radial distance from the vertical axis at which the flat portion exhibits substantial vertical curvature.

12. The system of claim 2, further comprising a ballast subsystem for weighting down the fluid containment subsystem on or proximate a bed of the body of water.

13. The system of claim 12, further comprising:
   a. a ballast subsystem configured to rest on the bed of the body of water;
   b. a plurality of tethering points disposed on the fluid containment subsystem; and
   c. at least one tether attaching the ballast subsystem to at least one of the plurality of tethering points;
   wherein the weight of the ballast subsystem is greater than a buoyant force acting on the fluid containment subsystem.

14. The system of claim 2, further comprising a compressed fluid conduit disposed to provide the fluid communication between the fluid containment subsystem and the compressor and expander.

15. The system of claim 14, wherein the compressed fluid conduit is one of flexible, semi-flexible, and jointed.

16. The system of claim 15, further comprising a support on the body of water for supporting the compressed fluid conduit at at least one point to impart to the compressed fluid conduit a catenary shape.

17. The system of claim 14, comprising a further compressed fluid conduit and a further submersible fluid containment subsystem, wherein the fluid containment subsystem in fluid communication with the compressor is in fluid communication with the further containment subsystem via the further compressed fluid conduit.

18. The system of claim 14, wherein a region of the fluid containment subsystem joined to the compressed fluid conduit is rigid.

19. The system of claim 18, wherein the rigid region comprises polyvinyl chloride.

20. The system of claim 2, wherein the at least one exchange port is a plurality of exchange ports and the plurality of exchange ports separates the fluid containment subsystem into a separate upper portion and separate lower portion configured to be joined together with fittings.

21. The system of claim 1, wherein the compressor and the expander are the same device.

22. The system of claim 1, wherein the expander is disposed to drive an electrical generator.

23. The system of claim 1, wherein the domed portion of the fluid containment subsystem a flexible fluid storage portion.

24. The system of claim 23, wherein the material of the fluid storage portion is a flexible membrane.

25. The system of claim 24, wherein the flexible membrane comprises a composite material.

26. The system of claim 25, wherein the composite material comprises a polyethylene matrix and glass fibers.

27. The system of claim 23, wherein the flexible membrane comprises at least one of polyurethane, carbon, acrylic, acrylene, polyester, and glass.

28. The system of claim 1, wherein the working fluid is one or more of a compressible gas, a compressible liquid, and a supercritical fluid.

29. The system of claim 28, wherein the compressible gas is air.

30. The system of claim 1, wherein the substantially flat portion is a substantially circular flat portion.

31. The system of claim 30, further comprising a substantially continuous barrier wall disposed on the bed of the body of water around the fluid containment subsystem.

32. The system of claim 31, wherein the barrier wall is comprised of New Jersey barriers.

33. A compressed fluid energy storage system comprising:
  a. a flexible fluid containment subsystem submersible in a body of water;
  b. a separate ballast system disposed above the submersible fluid containment subsystem within the body of water;
  c. a compressor disposed in fluid communication with the fluid containment subsystem and configured to supply compressed working fluid to the fluid containment subsystem;
  d. an expander disposed in fluid communication with the fluid containment subsystem and configured to:
    i. receive compressed working fluid from the fluid containment subsystem; and
    ii. expand the compressed working fluid; and
  e. a fluid conduit disposed to place the fluid containment subsystem in fluid communication with the compressor and the expander.

34. The system of claim 33, further comprising a tensegrity structure disposed on a bed of the body of water to entrap the fluid containment subsystem, wherein the ballast subsystem rests on the tensegrity structure.

35. The system of claim 34, wherein the tensegrity structure is a hexagonal tensegrity structure.

36. The system of claim 35, wherein the tensegrity structure is disposed to restrain the fluid containment subsystem at at least six points on an upper surface of the fluid containment subsystem.

37. The system of claim 34, wherein:
  a. the fluid containment subsystem is fastened to one of the bed of the body of water and a base of the tensegrity structure; and
  b. the fluid containment subsystem is open at the bottom.

* * * * *